(12) United States Patent
Maruyama et al.

(10) Patent No.: US 9,933,808 B2
(45) Date of Patent: Apr. 3, 2018

(54) REACTION FORCE PEDAL DEVICE

(71) Applicant: HONDA MOTOR CO., LTD., Minato-ku, Tokyo (JP)

(72) Inventors: Kohei Maruyama, Utsunomiya (JP); Naoto Sen, Utsunomiya (JP); Hideto Nebuya, Utsunomiya (JP); Toru Ebara, Ashikaga (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/286,181

(22) Filed: May 23, 2014

(65) Prior Publication Data

US 2014/0251069 A1    Sep. 11, 2014

Related U.S. Application Data

(63) Continuation of application No. 13/818,131, filed as application No. PCT/JP2011/068028 on Aug. 8, 2011, now Pat. No. 8,770,060.

(30) Foreign Application Priority Data

Aug. 31, 2010  (JP) .................................. 2010-193886

(51) Int. Cl.
    *G05G 1/30*      (2008.04)
    *G05G 1/44*      (2008.04)
    *B60K 26/02*     (2006.01)
(52) U.S. Cl.
    CPC ............. *G05G 1/44* (2013.01); *B60K 26/021* (2013.01); *G05G 1/30* (2013.01); *B60K 2026/023* (2013.01); *Y10T 74/20534* (2015.01)

(58) Field of Classification Search
    CPC ................................. G05G 1/44; G05G 1/445
    USPC ............................................ 74/512, 513, 560
    See application file for complete search history.

(56) References Cited

U.S. PATENT DOCUMENTS

| 4,224,832 | A | 9/1980 | Prohaska et al. |
| 5,215,057 | A | 6/1993 | Sato et al. |
| 5,568,797 | A | 10/1996 | Landerretche |
| 7,318,361 | B2* | 1/2008 | Boutteville et al. ............ 74/518 |
| 7,770,491 | B2* | 8/2010 | Ritter ................... B60K 26/021 74/560 |
| 2004/0259687 | A1 | 12/2004 | Ritter et al. |
| 2005/0016318 | A1 | 1/2005 | Allard et al. |
| 2005/0209743 | A1* | 9/2005 | Egami ................................ 701/1 |
| 2011/0098901 | A1 | 4/2011 | Shiomi et al. |
| 2011/0260557 | A1* | 10/2011 | Noh ..................... B60K 26/021 310/12.04 |

(Continued)

FOREIGN PATENT DOCUMENTS

| DE | 10 2004 024 763 A1 | 12/2005 |
| DE | 10 2009 032 775 B3 | 11/2010 |
| EP | 1 375 233 A1 | 1/2004 |

(Continued)

*Primary Examiner* — Vicky A Johnson
(74) *Attorney, Agent, or Firm* — Carrier Blackman & Associates, P.C.; Joseph P. Carrier; William D. Blackman

(57) ABSTRACT

A reaction force pedal device provided with pedal members operated by a driver, a motor which applies a reaction force to the pedal members through an arm member which is always connected to the pedal members, and a clutch arranged between the motor and the arm member. When the pedal members are displaced, the clutch is temporarily released.

6 Claims, 11 Drawing Sheets

(56) References Cited

U.S. PATENT DOCUMENTS

2013/0152725 A1* 6/2013 Maruyama et al. ............ 74/513

FOREIGN PATENT DOCUMENTS

| JP | 05-088182 U | 11/1993 |
| JP | 8-292713 A | 11/1996 |
| JP | 11-235091 A | 8/1999 |
| JP | 2005-508060 A | 3/2005 |
| JP | 2006-176001 A | 7/2006 |
| JP | 2007-026218 A | 2/2007 |
| JP | 2007-168631 A | 7/2007 |
| WO | 2004/005063 A1 | 1/2004 |
| WO | 2009/136512 A1 | 11/2009 |

* cited by examiner

FIG. 9
| TIME | t1 | t2 | t3 | t4 |
|---|---|---|---|---|
| DEPRESSED AMOUNT $\theta$ | 5 | 10 | 0 | 5 |
| ROTATIONAL ANGLE $\theta_m$ OF MOTOR | 0 | 10 | 10 | 10 |
| MOTOR REACTION FORCE Fr | LARGE | SMALL | NONE | LARGE |
| CLUTCH STATE | ENGAGED | ENGAGED | DISENGAGED | ENGAGED |
| ACCELERATOR PEDAL STATE | 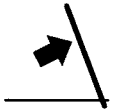 | 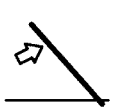 | 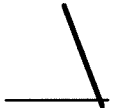 | 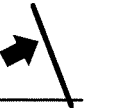 |

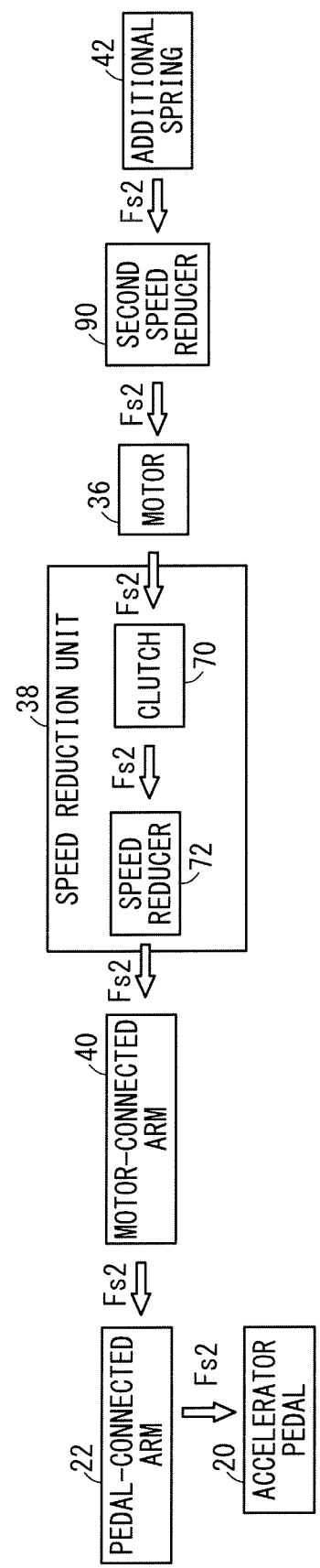

REACTION FORCE PEDAL DEVICE

CROSS-REFERENCE TO RELATED APPLICATIONS

The present application is a continuation of prior U.S. patent application Ser. No. 13/818,131 filed 21 Feb. 2013 as the US National Phase of International Application PCT/JP2011/068028 filed 8 Aug. 2011, which claims priority under 35 USC 119 based on Japanese Patent Application No. 2010-193886, filed 31 Aug. 2010. The subject matter of each of these priority documents is incorporated by reference herein.

TECHNICAL FIELD

The present invention relates to a reaction force pedal device having pedal members, which are operable by a driver, and a motor for applying a reaction force to the pedal members.

BACKGROUND ART

An arrangement is known in which an actuator applies a reaction force to an accelerator pedal depending on the depressed amount of the accelerator pedal, i.e., the amount at which the accelerator pedal is depressed. See, for example, International Publication No. 2009/136512 (hereinafter referred to as "WO2009/136512A1") and Japanese Laid-Open Patent Publication No. 2007-026218 (hereinafter referred to as "JP2007-026218A").

According to WO2009/136512A1, the actuator has a reaction force applying characteristic, which is set depending on a target speed in order to assist the driver in operating the accelerator pedal (see, for example, Abstract and FIGS. 3A through 3C).

According to JP2007-026218A, an accelerator pedal (3) and a servomotor (19) are connected to each other by a pedal lever (5) and an arm member (15). The servomotor has a drive shaft (19b) with a gear (19a) connected to a distal end of the drive shaft, and the gear (19a) is held in mesh with teeth (15b) of the pedal lever. The structural members apply a reaction force from the servomotor to the accelerator pedal (see Abstract and FIG. 1).

As described above, according to JP2007-026218A, a reaction force is transmitted through a speed reduction mechanism including a gear (19a) and teeth (15b). However, nothing is disclosed in the description of JP2007-026218A concerning details (gear ratio, etc.) of the speed reduction mechanism.

FIGS. 1, 2, and 4 of JP2007-026218A show a gear and teeth. Judging from the figures, even if the gear of the motor were rotated to a maximum extent, only a portion of the gear will come into contact with or mesh with the teeth, thus leaving another portion of the gear which never meshes with the teeth. Therefore, a large force is continuously applied to only the portion of the gear that is held in mesh with the teeth, thereby causing the gear to have a region that is intensively worn, as well as a region that is not worn at all. As a result, even when the gear of the motor is rotated maximally, a liability exists for the gear to become less durable than if the gear was constructed such that it meshes with the teeth over the full circumference thereof.

The fact that only a portion of the gear is held in mesh with the teeth upon rotation of the gear of the motor to a maximum extent implies that the drive shaft of the motor is angularly moved through an angle that is smaller than 360°.

Therefore, not only the gear, but also various other parts of the motor are subject to localized forces, thus making the motor less durable than if averaged forces were applied to parts of the motor. If the motor comprises a brush motor, then the commutator of the brush motor contacts the brushes within a limited range, such that only particular regions of the brush motor wear easily. In such a case, steps tend to develop between regions that are intensively worn and regions that are not intensively worn, resulting in a reduction in durability of the motor. Furthermore, noise and load differences occur due to different amounts of wear (different resistances to rotation of the motor), which could possibly make the user feel strange concerning the manner in which the reaction force pedal device operates.

SUMMARY OF INVENTION

The present invention has been made in view of the foregoing problems. An object of the present invention is to provide a reaction force pedal device, which is capable of increasing the durability of a transmission system that transmits a reaction force.

Another object of the present invention is to provide a reaction force pedal device, which prevents the user from feeling strange concerning the manner in which the reaction force pedal device operates.

A reaction force pedal device according to the present invention includes a pedal member operable by a driver, a motor for applying a reaction force to the pedal member through an arm member, which is coupled at all times to the pedal member, and a clutch disposed between the motor and the arm member, wherein the clutch is temporarily disengaged when the pedal member is displaced.

According to the present invention, upon displacement of the pedal member, the clutch is temporarily disengaged. Therefore, after the clutch has been disengaged, the position of the pedal member (the amount at which the pedal member is depressed) and the rotational angle of the motor deviate from each other. Consequently, forces that act on parts of the force transmitting system for transmitting the motor reaction force (such as parts of the motor, the pedal member, etc.) are prevented from being concentrated only on certain parts, thereby making it possible to increase the overall durability of the force transmitting system. If the motor is a brush motor, then the range of mutual contact between the commutator and the brushes is increased, thereby spreading out any worn regions. As a consequence, noise and load differences are prevented from occurring due to different amounts of wear caused by wearing of certain regions only. Thus, the driver or user is prevented from feeling strange concerning the manner in which the reaction force pedal device operates.

When the pedal member is displaced, the pedal member may either be depressed from or returned to a non-actuated position thereof. As used herein "returned" means returned to or towards the non-actuated position thereof.

If the pedal member includes an accelerator pedal, then a threshold value may be established with respect to a change per unit time in a depressed amount of the accelerator pedal, by which it is judged whether or not the accelerator pedal is returned, or whether or not the accelerator pedal is returned at a predetermined speed. The clutch may temporarily be disengaged if the change exceeds the threshold value.

The clutch is temporarily disengaged when the accelerator pedal is returned toward its non-actuated position or when the accelerator pedal is returned at at least a predetermined speed. Generally, when the accelerator pedal is returned toward the non-actuated position thereof or returned at at least a predetermined speed (especially when the accelerator pedal is returned at a high speed), the need for generating the motor reaction force is smaller than when the accelerator pedal is depressed or is kept in a constant position. With the above arrangement, it is possible to make the position of the accelerator pedal (the amount at which the accelerator pedal is depressed) and the rotational angle of the motor output shaft deviate from each other if the need for generating the motor reaction force is small. Therefore, the relationship between the position of the accelerator pedal (the amount at which the accelerator pedal is pressed) and the rotational angle of the motor output shaft can be adjusted without causing the driver to feel uncomfortable.

The reaction force pedal device may further include a speed reducer disposed between the motor and the arm member. The speed reducer may have a speed reduction ratio, wherein the speed reduction ratio is set such that the motor has a rotational angle equal to or greater than 360° when the arm member is fully displaced through a displaceable range thereof.

Consequently, when the accelerator pedal is angularly displaced maximally through the full displaceable range thereof, the output shaft of the motor rotates about its axis through 360° or greater. Therefore, forces that act on parts of the force transmitting system for transmitting the motor reaction force (such as parts of the motor, the pedal member, etc.) are prevented from being concentrated only on certain parts or on certain regions of certain parts, thereby making it possible to increase the overall durability of the force transmitting system. If the motor is a brush motor, then the range of mutual contact between the commutator and the brushes is increased, thereby spreading out any worn regions. As a consequence, noise and load differences are prevented from occurring due to different amounts of wear caused by wearing of only certain regions of the commutator and the brushes. Thus, the driver or user is prevented from feeling strange concerning the manner in which the reaction force pedal device operates. Further, even in the event of a failure of the clutch, the motor is guaranteed to rotate the output shaft through 360° or greater when the pedal is displaced through the full displaceable range thereof, thereby allowing the reaction force pedal device to operate in the above-described manner and to offer the advantages described above.

Even if it is not necessary for the motor to generate the reaction force, the motor may be energized in order to eliminate backlash in a force transmitting system from the motor to the pedal member. Therefore, when there is no need to generate the motor reaction force, backlash is eliminated in the force transmitting system from the motor to the accelerator pedal. Consequently, if the motor reaction force is generated at a subsequent time, the motor reaction force can be generated with a quick response.

The reaction force pedal device may further include a biasing member for applying a biasing force at all times independently of the motor in a direction in which the reaction force is generated by the motor. The biasing member may apply the biasing force to eliminate backlash in a force transmitting system from the motor to the pedal member. Therefore, when there is no need to generate the motor reaction force, backlash is eliminated in the force transmitting system from the motor to the accelerator pedal. Consequently, if the motor reaction force is generated at a subsequent time, the motor reaction force can be generated with a quick response.

The reaction force pedal device may further include a second speed reducer disposed between the motor and the biasing member. Assuming that the second speed reducer is arranged in order to reduce the rotational angle of the output shaft of the motor, which is produced under the biasing force from the biasing member, then the biasing force from the biasing member can be finely adjusted with ease.

BRIEF DESCRIPTION OF DRAWINGS

FIG. 9 is a diagram showing by way of example a relationship between states and depressed amounts of the accelerator pedal, rotational angles of a motor, motor reaction forces, and engaged and disengaged states of the clutch;

FIG. 11 is a block diagram showing a second modification of the arrangement shown in FIG. 7.

DESCRIPTION OF EMBODIMENTS

A. Embodiment

Figure 1:
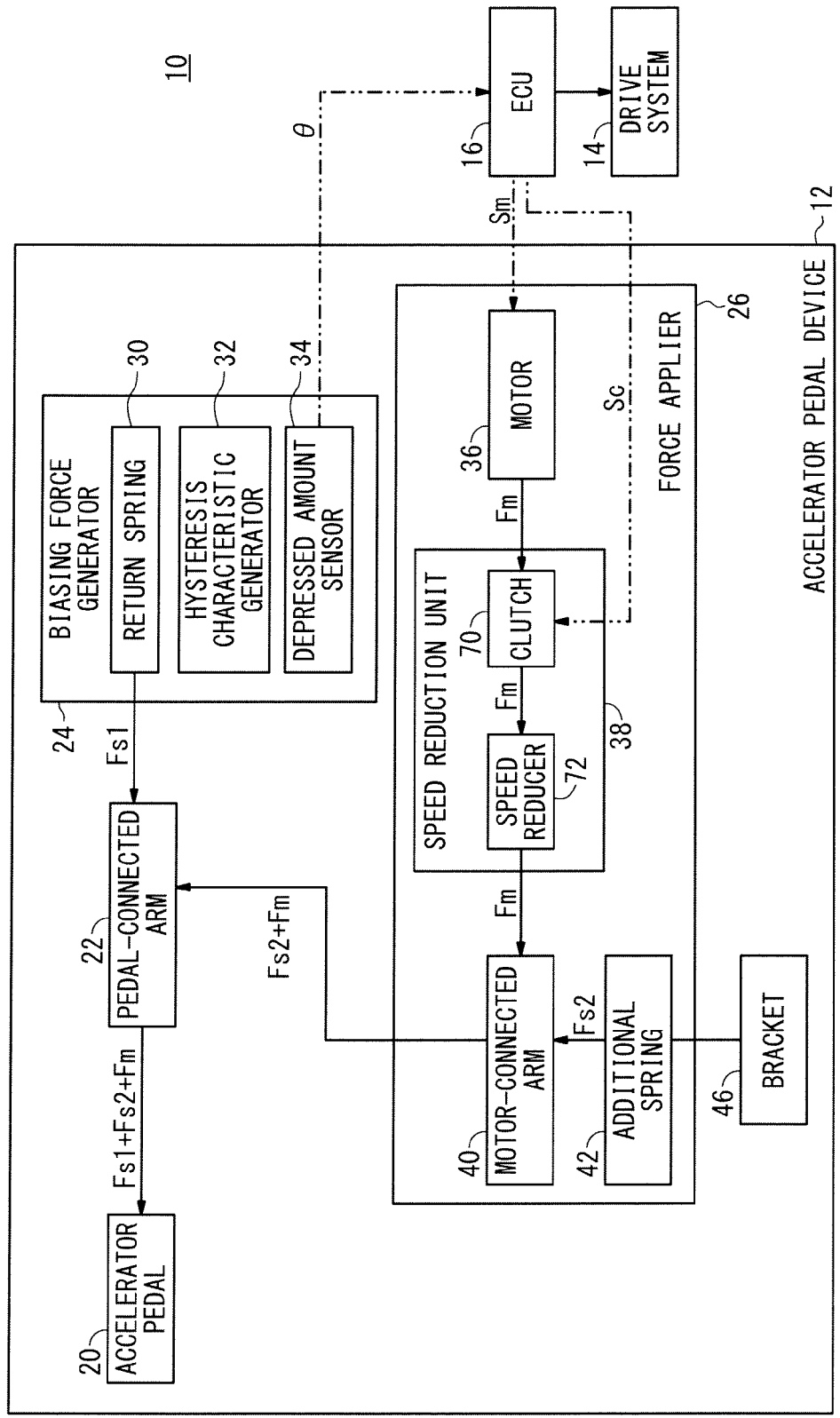
FIG. 1 is a block diagram of a vehicle incorporating an accelerator pedal device therein according to an embodiment of the present invention.
Figure 2:
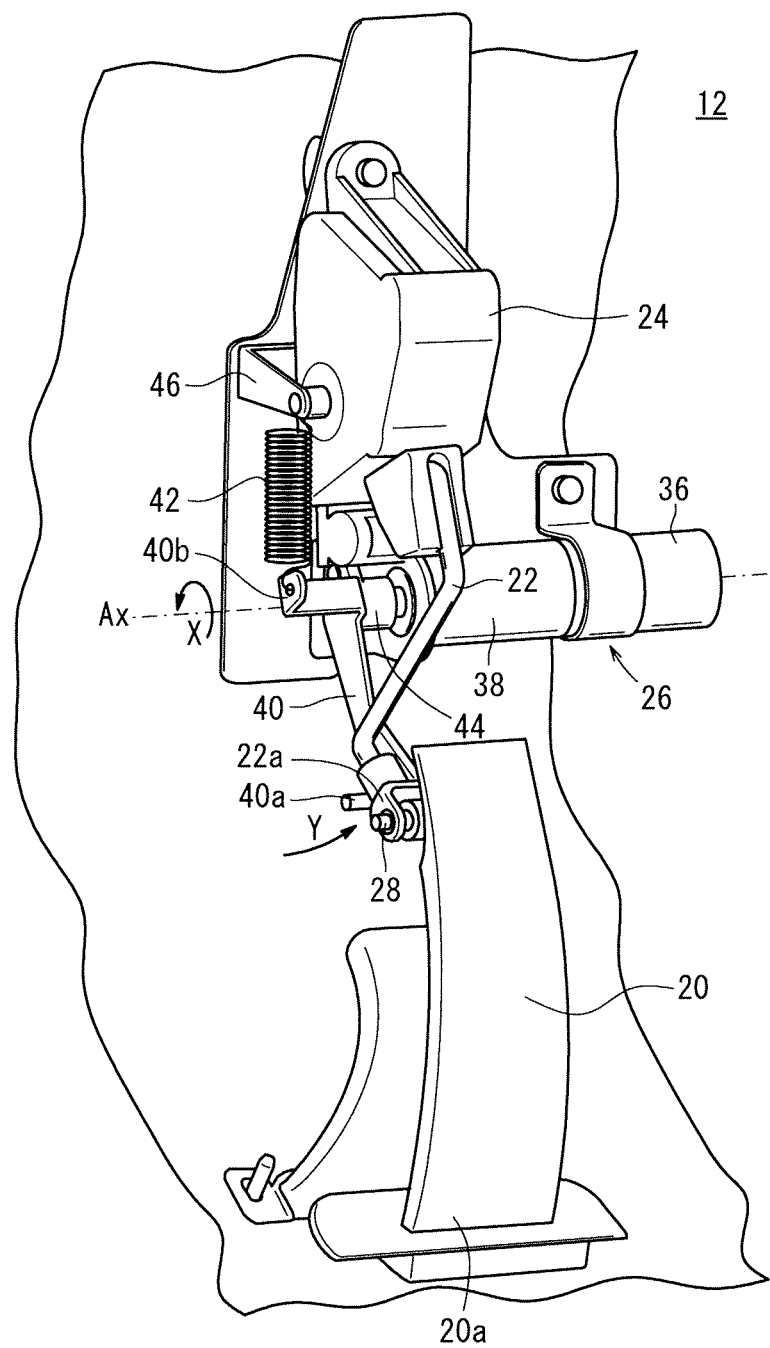
FIG. 2 is a perspective view of the accelerator pedal device.
Figure 3:
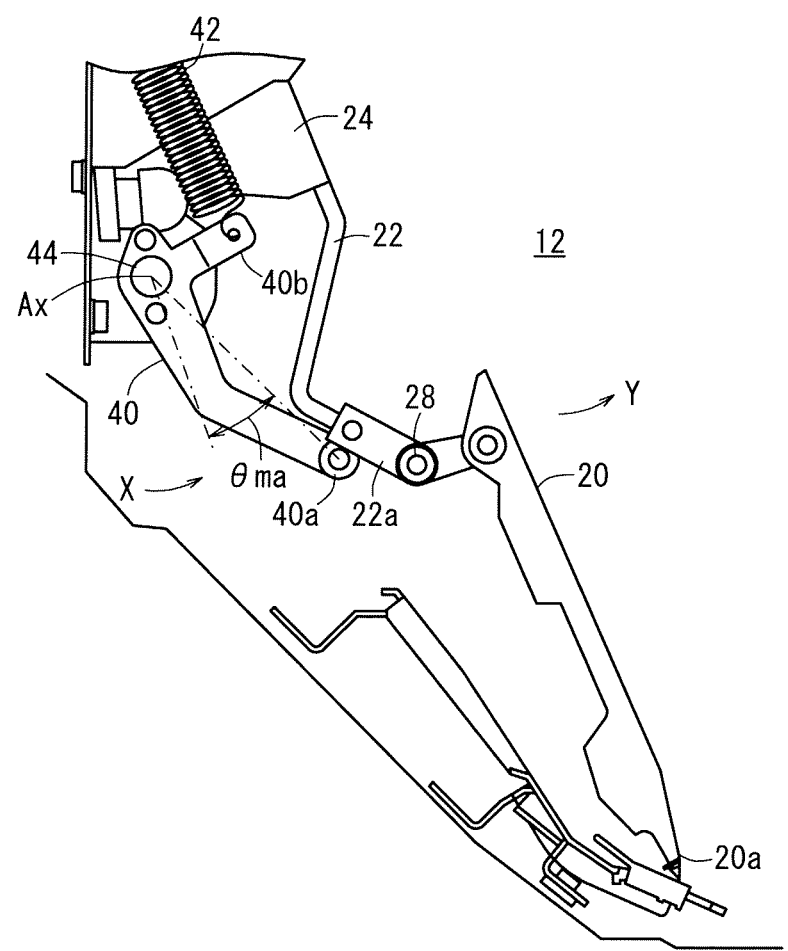
FIG. 3 is a side elevational view of the accelerator pedal device.

1. Arrangement of Vehicle 10:
(1) Overall Arrangement:

FIG. 1 is a block diagram of a vehicle 10 that incorporates therein an accelerator pedal device 12 (reaction force pedal device) according to an embodiment of the present invention. FIG. 2 is a perspective view of the accelerator pedal device 12. FIG. 3 is a side elevational view of the accelerator pedal device 12. The vehicle 10 comprises a gasoline-powered vehicle, for example. Alternatively, the vehicle 10 may comprise a hybrid vehicle, or an electric vehicle including a fuel battery vehicle, for example.

The vehicle 10 includes a drive system 14 and an electronic control unit 16 (hereinafter referred to as an "ECU 16") in addition to the accelerator pedal device 12.

(2) Accelerator Pedal Device 12:

The accelerator pedal device 12 includes an accelerator pedal 20, a pedal-connected arm 22, a biasing force generator 24, and a force applier 26.

(a) Pedal-Connected Arm 22:

As shown in FIGS. 2 and 3, the pedal-connected arm 22 has an end (hereinafter referred to as an "end 22*a*") swingably coupled to the accelerator pedal 20 by a shaft 28. The other end of the pedal-connected arm 22 is swingably supported by the biasing force generator 24.

(b) Biasing Force Generator 24:

The biasing force generator 24 has a mechanical arrangement for generating a biasing force (hereinafter referred to as a "first biasing force Fs1" [N]) to return the pressed accelerator pedal 20 to an original position, and for applying the generated first biasing force Fs1 to the accelerator pedal 20. As shown in FIG. 1, the biasing force generator 24 includes a return spring 30, a hysteresis characteristic generator 32, and a depressed amount sensor 34.

Figure 4:
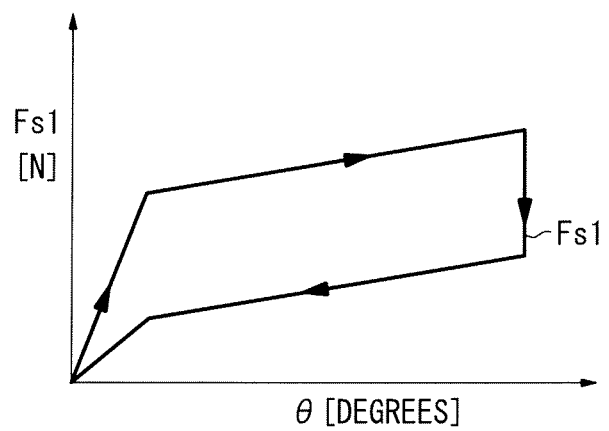
FIG. 4 is a diagram showing a relationship between a depressed amount of an accelerator pedal and a first biasing force generated by a biasing force generator.

The hysteresis characteristic generator 32 generates and imparts a hysteresis characteristic to the first biasing force Fs1 generated by the return spring 30. More specifically, as shown in FIG. 4, the hysteresis characteristic generator 32 increases the first biasing force Fs1 when the accelerator pedal 20 is depressed, and reduces the first biasing force Fs1 when the accelerator pedal 20 is returned.

The return spring 30 and the hysteresis characteristic generator 32 may be arranged in the same manner as disclosed in International Publication No. 01/19638. Based on displacement of the pedal-connected arm 22, the depressed amount sensor 34 detects the amount (depressed amount θ) [degrees] at which the accelerator pedal 20 is depressed from the original position thereof, and outputs the detected depressed amount θ to the ECU 16. The depressed amount sensor 34 may be disposed in another region apart from the biasing force generator 24.

Figure 5:
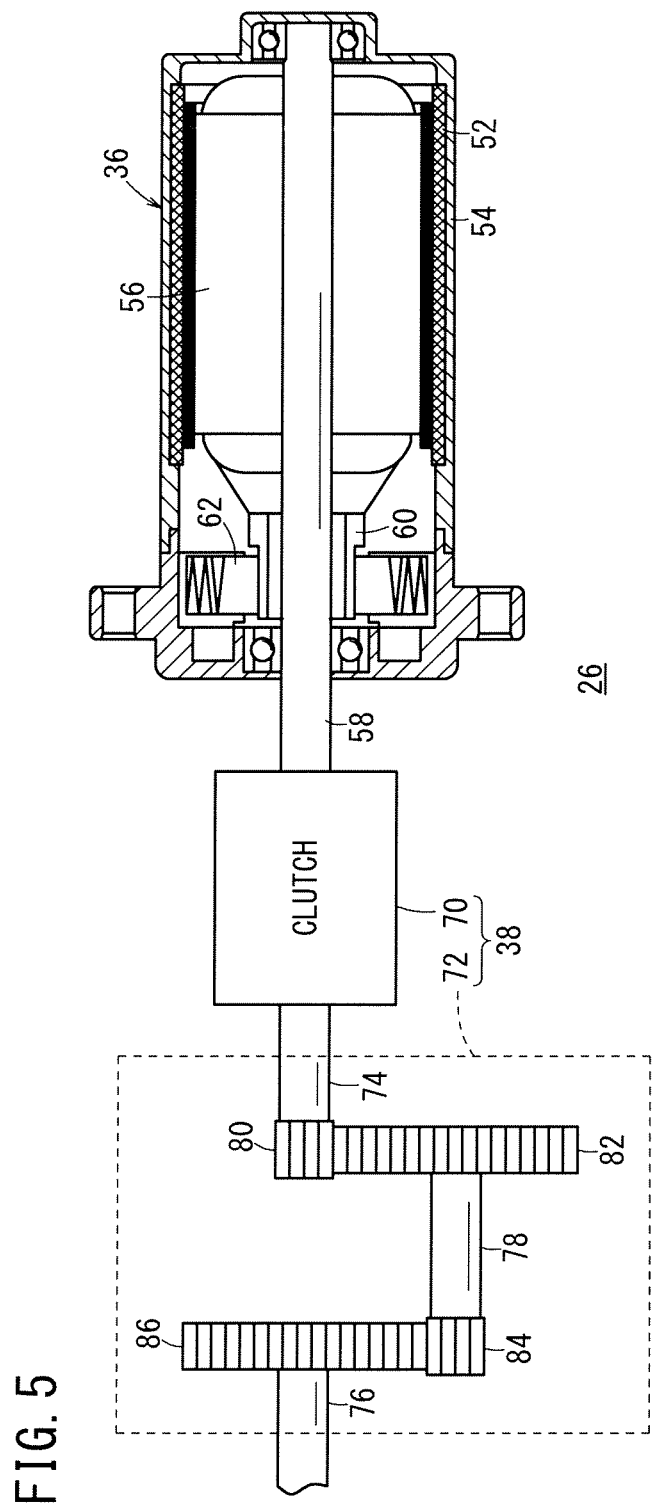
FIG. 5 is a view showing internal structural details of a force applier according to the embodiment.

(c) Force Applier 26:

FIG. 5 is a view showing the internal structure of the force applier 26. The force applier 26 serves to generate a force (hereinafter referred to as a "motor force Fm" [N]), which is applied to the accelerator pedal 20. As shown in FIGS. 1 through 3 and 5, the force applier 26 includes a motor 36 that serves as an actuator, a speed reduction unit 38, a motor-connected arm 40, and an additional spring 42.

Depending on a control signal Sm from the ECU 16, the motor 36 generates a motor force Fm. According to the present embodiment, the motor 36, which comprises a DC brush motor, includes a permanent magnet 52 which is fixed to a case 54, an armature 56 rotatable about an output shaft 58 of the motor 36, a commutator 60 for controlling the direction of a current, and brushes 62 for supplying current through the commutator 60 to the armature 56. The motor force Fm generated by the motor 36 is output through the output shaft 58 to the speed reduction unit 38. Instead of the motor 36, the force applier 26 may employ a different type of drive force generating means (e.g., a pneumatic actuator).

As shown in FIGS. 1 and 5, the speed reduction unit 38 includes a clutch 70 and a speed reducer 72.

Based on a control signal Sc from the ECU 16, the clutch 70 controls the connection between the output shaft 58 of the motor 36 and an input shaft 74 of the speed reducer 72. The clutch 70 may comprise a dog clutch or an electromagnetic clutch, for example.

The speed reducer 72 serves to rotate an output shaft 76 at a predetermined gear ratio with respect to the rotational angle of the input shaft 74. In addition to the input shaft 74 and the output shaft 76, the speed reducer 72 includes an intermediate shaft 78, which is disposed between the input shaft 74 and the output shaft 76. The speed reducer 72 further comprises a first gear 80, which is disposed on an end of the input shaft 74, a second gear 82, which is disposed on an end of the intermediate shaft 78 and held in mesh with the first gear 80, a third gear 84, which is disposed on the other end of the intermediate shaft 78, and a fourth gear 86, which is disposed on an end of the output shaft 76 and held in mesh with the third gear 84. Details concerning the gear ratio of the speed reducer 72 will be described later.

As shown in FIGS. 2 and 3, the motor-connected arm 40 includes a turn shaft 44, which is coupled to the speed reduction unit 38. The motor-connected arm 40 can be turned about the turn shaft 44 (turn axis Ax). One end of the motor-connected arm 40 (hereinafter referred to as an "end 40a") is held in abutment against the end 22a of the pedal-connected arm 22, and the other end of the motor-connected arm 40 (hereinafter referred to as an "end 40b") is coupled to an end of the additional spring 42.

The additional spring 42, one end of which is coupled to the motor-connected arm 40, has another end thereof coupled to a bracket 46. The bracket 46 is fixed to a non-illustrated vehicle body. The motor-connected arm 40 normally is biased under a biasing force (hereinafter referred to as a "second biasing force Fs2" [N]) from the additional spring 42, so as to turn about the turn shaft 44 in the direction of the arrow X in FIGS. 2 and 3. Therefore, the end 40a of the motor-connected arm 40 normally biases the end 22a of the pedal-connected arm 22, so as to turn the end 22a of the pedal-connected arm 22 in the direction of the arrow Y. Thus, the end 40a of the motor-connected arm 40 is held in abutment against the end 22a of the pedal-connected arm 22 at all times.

With the above arrangement, the motor-connected arm 40 can be turned within an angular range θma [°] (FIG. 3), which is limited to a certain value (e.g., 22°).

If the motor 36 generates the motor force Fm while the clutch 70 is engaged, the motor force Fm is transmitted to the accelerator pedal 20 through the speed reduction unit 38, the motor-connected arm 40, and the pedal-connected arm 22. Accordingly, in addition to the first biasing force Fs1 from the return spring 30 and the second biasing force Fs2 from the additional spring 42, the motor force Fm from the motor 36 also is applied to the accelerator pedal 20.

(3) Drive System 14:

The drive system 14, which serves to apply a drive force to the vehicle 10, includes an engine, a transmission, road wheels, etc., not shown.

(4) ECU 16:

The ECU 16 controls the drive system 14 and the force applier 26 based on the depressed amount θ of the accelerator pedal 20, which is detected by the depressed amount sensor 34.

2. Movement of Various Parts Depending on Accelerator Pedal 20:

When the driver presses the accelerator pedal 20, the accelerator pedal 20 is turned about the proximal end 20a thereof, thereby moving the distal end of the accelerator pedal 20 downwardly. Thus, the end 22a of the pedal-connected arm 22 is turned downwardly while changing the angle with respect to the accelerator pedal 20. At this time, the pedal-connected arm 22 is subjected to the first biasing force Fs1 from the biasing force generator 24 (return spring 30). Since the pedal-connected arm 22 is turned downwardly, the end 22a of the pedal-connected arm 22 presses the end 40a of the motor-connected arm 40. As a result, the end 22a of the pedal-connected arm 22 moves downwardly in unison with the end 40a of the motor-connected arm 40. Since the turning movement of the motor-connected arm 40 pulls on the additional spring 42, the second biasing force Fs2 from the additional spring 42 acts as an origin-returning force on the motor-connected arm 40.

The ECU 16 establishes an output of the motor 36, i.e., the motor force Fm, depending on the depressed amount θ detected by the depressed amount sensor 34. The motor force Fm is transmitted to the motor-connected arm 40 through the speed reduction unit 38.

Therefore, together with the depressing force applied from the driver to the accelerator pedal 20, the first biasing force Fs1 from the return spring 30, the motor force Fm from the motor 36, and the second biasing force Fs2 from the additional spring 42 act on the pedal-connected arm 22.

3. Control of Motor Output:

(1) Overview:

According to the present embodiment, as described above, biasing forces applied to the accelerator pedal 20 include the first biasing force Fs1, which is generated by the biasing force generator 24, the motor force Fm, which is generated by the motor 36, and the second biasing force Fs2, which is generated by the additional spring 42. The total of the biasing forces that are applied to the accelerator pedal 20 will hereinafter be referred to as a "total biasing force Ft". Among the forces that make up the total biasing force Ft, the motor force Fm and the second biasing force Fs2 are added by the force applier 26, which is incorporated in the vehicle 10. On the other hand, the first biasing force Fs1 is applied to the accelerator pedal 20 even if the force applier 26 is not incorporated in the vehicle 10.

According to the present embodiment, the motor force Fm functions as a motor reaction force Fr for indicating an appropriate depressed amount θ to the driver, and as a backlash compensation force Fb for eliminating backlash in the force transmitting system (i.e., force applier 26) from the motor 36 to the motor-connected arm 40 in order to keep the parts in contact with each other. The ECU 16 thus controls the motor force Fm by controlling both the motor reaction force Fr and the backlash compensation force Fb in combination.

(2) Control of Motor Reaction Force Fr:

As described above, the motor reaction force Fr is a motor force Fm for indicating an appropriate depressed amount θ to the driver. The motor reaction force Fr is controlled using the depressed amount θ, which is detected by the depressed amount sensor 34, and the vehicle speed [km/h], which is detected by a non-illustrated vehicle speed sensor, etc. The motor reaction force Fr may be controlled by means of the arrangement disclosed in WO2009/136512A1, for example.

(3) Control of Backlash Compensation Force Fb:

(a) Details of Control of Backlash Compensation Force Fb

As described above, the backlash compensation force Fb is a motor force Fm for eliminating backlash in the force applier 26 in order to keep the parts in contact with each other. More specifically, the backlash compensation force Fb keeps the motor 36 and the clutch 70, parts in the clutch 70, the first gear 80 and the second gear 82, the third gear 84 and the fourth gear 86, the output shaft 76 and the motor-connected arm 40, and the motor-connected arm 40 and the pedal-connected arm 22 in contact with each other.

The backlash compensation force Fb is controlled specifically in the following manner. A minimum value Fmin [N] for the motor force Fm, which is required to eliminate backlash in the force applier 26, is established in advance. The minimum value Fmin may be a measured value or a simulated value, for example. In order to establish the minimum value Fmin, the effect of the second biasing force Fs2, which is generated by the additional spring 42, may be taken into account.

The backlash compensation force Fb is generated in order to ensure that the motor force Fm will not be smaller than the minimum value Fmin. Stated otherwise, when a motor force Fm other than the backlash compensation force Fb (i.e., the motor reaction force Fr in the present embodiment) is smaller than the minimum value Fmin, the difference between the motor reaction force Fr and the minimum value Fmin is regarded as the backlash compensation force Fb (when Fr<Fmin, Fb=Fr−Fmin, and when Fr≥Fmin, Fb=0). Alternatively, regardless of the magnitude of the motor reaction force Fr, a value, which is equal to the minimum value Fmin at a time that the motor reaction force Fr is zero, may be set as the backlash compensation force Fb.

(b) Comparison Between Present Embodiment and Comparative Example

Figure 6:
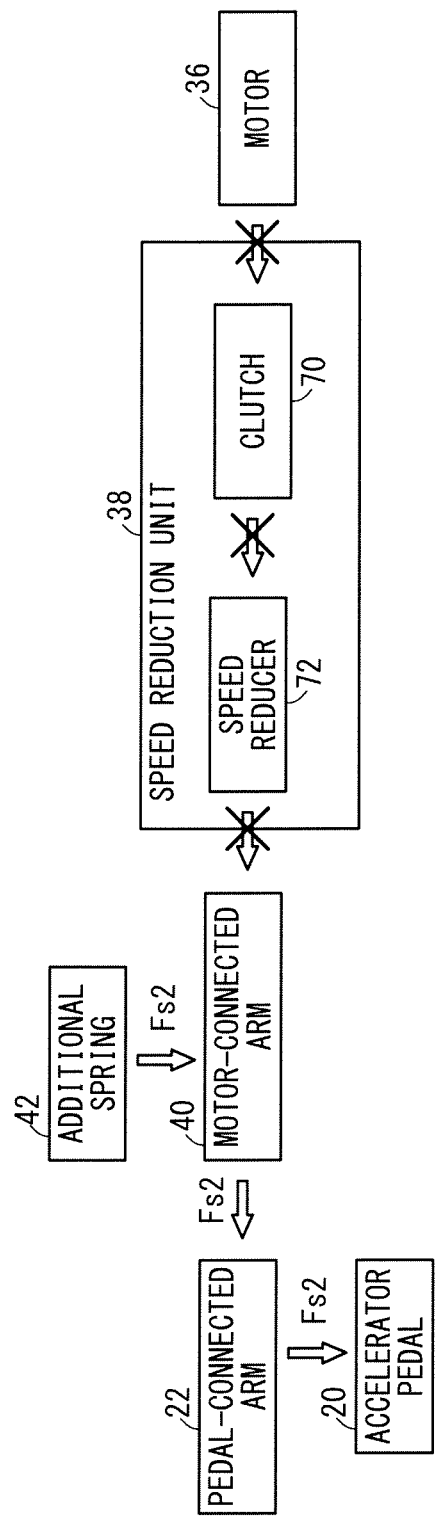
FIG. 6 is a block diagram showing how a force is generated without generation of a motor reaction force, according to a comparative example in which a backlash compensating force is not used.
Figure 7:
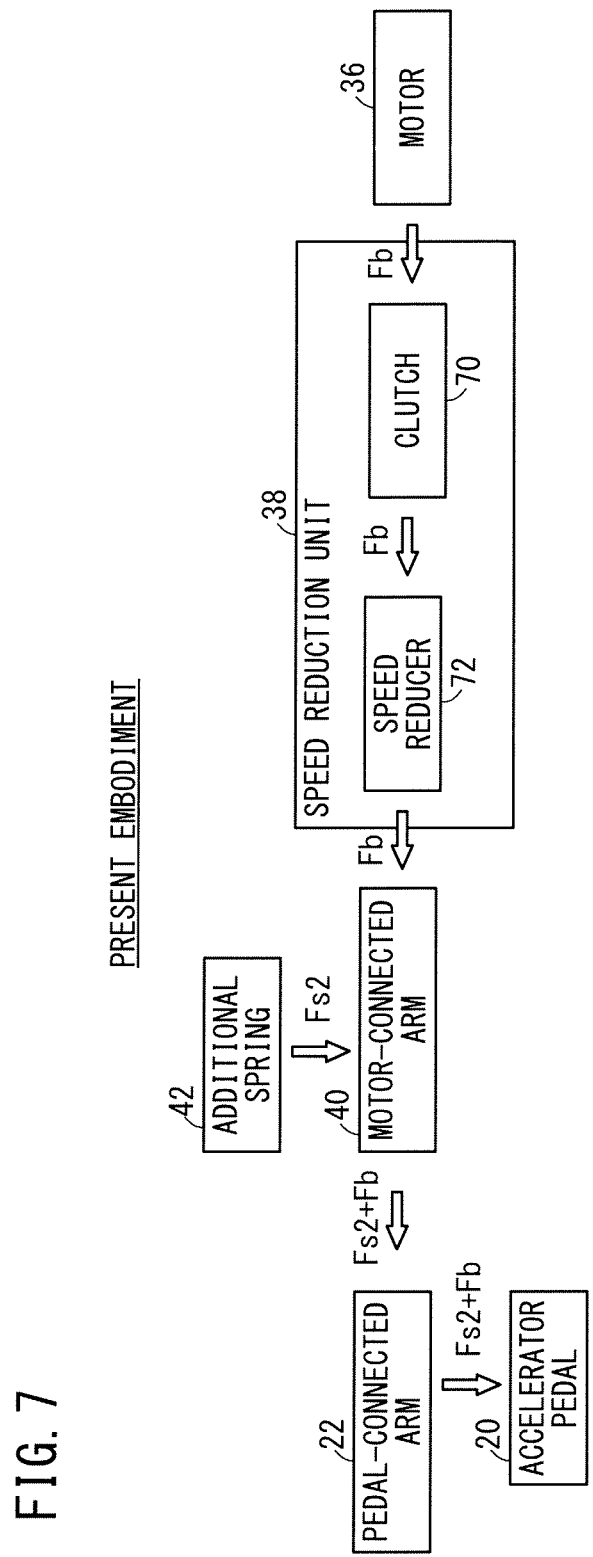
FIG. 7 is a block diagram showing how forces are generated without generation of a motor reaction force, according to the embodiment in which a backlash compensating force is used.

FIG. 6 is a block diagram showing how a force (second biasing force Fs2) is generated without a motor reaction force Fr being generated, according to a comparative example in which the backlash compensating force Fb is not used. FIG. 7 is a block diagram showing how forces (the second biasing force Fs2 and the backlash compensation force Fb) are generated without a motor reaction force Fr being generated according to the present embodiment. For illustrative purposes, in FIGS. 6 and 7, the return spring 30 and the first biasing force Fs1 generated thereby are not taken into account.

According to the comparative example, as shown in FIG. 6, when the motor 36 does not generate the motor force Fm, non-contact regions (i.e., backlash) may possibly occur between the motor 36 and the clutch 70, parts in the clutch 70, the clutch 70 and the speed reducer 72, parts in the speed reducer 72, and the speed reducer 72 and the motor-connected arm 40. When the motor 36 begins to generate the motor force Fm, therefore, a delay may possibly be caused in transmitting the motor force Fm, and noise may possibly occur due to contact between the various parts.

According to the present embodiment, as shown in FIG. 7, even during times that the motor 36 does not generate the motor reaction force Fr, the motor 36 generates the backlash compensation force Fb. Therefore, it is possible to eliminate non-contact regions (i.e., backlash) between the motor 36 and the clutch 70, parts in the clutch 70, the clutch 70 and the speed reducer 72, parts in the speed reducer 72, and the speed reducer 72 and the motor-connected arm 40. Thus, when the motor 36 begins to generate the motor reaction force Fr, a delay is not caused in transmitting the motor force Fm, and noise is prevented from occurring due to contact between the various parts.

According to the present embodiment, a control process is carried out in order to disengage the clutch 70, as will be described later. During implementation of such a control process, generation of the backlash compensation force Fb may be canceled.

In FIGS. 6 and 7, the second biasing force Fs2 from the additional spring 42 may be applied to the side of the motor 36, so as to eliminate non-contact regions between the motor 36 and the clutch 70, parts in the clutch 70, the clutch 70 and the speed reducer 72, parts in the speed reducer 72, and the speed reducer 72 and the motor-connected arm 40. However, if the additional spring 42 is used in this manner, the additional spring 42 fails to bias the side of the motor 36 when the accelerator pedal 20 returns to its original position. By using the backlash compensation force Fb, the above advantages can be achieved even when the accelerator pedal 20 returns to its original position.

4. Control of Clutch 70:

Control of the clutch 70 according to the present embodiment will be described below. According to the present embodiment, while the clutch 70 is disengaged, the relationship between the rotational angle (phase) of the output shaft 58 of the motor 36 (the rotational angle θm of the motor 36) and the rotational angle (phase) of the input shaft 74 of the speed reducer 72 undergoes a change, thereby preventing localized regions of the motor 36 and the speed reducer 72 from being used (preventing most of the motor force Fm from acting only on portions of the motor 36 and the speed reducer 72).

The clutch 70 is controlled by the ECU 16 based on the depressed amount θ from the depressed amount sensor 34.

Figure 8:
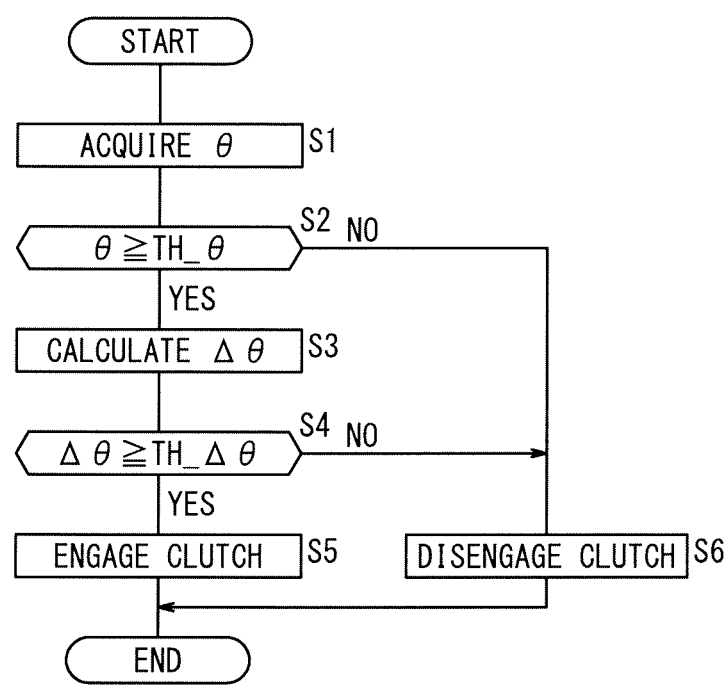
FIG. 8 is a flowchart of an operation sequence of an electronic control unit for engaging and disengaging a clutch.

FIG. 8 is a flowchart of an operation sequence of the ECU 16 for engaging and disengaging the clutch 70. In step S1, the ECU 16 acquires the depressed amount θ from the depressed amount sensor 34. In step S2, the ECU 16 judges whether or not the depressed amount θ is equal to or greater than a threshold value TH_θ. The threshold value TH_θ is a first threshold value by which it is judged whether the clutch 70 should be engaged or disengaged. According to the present embodiment, the threshold value TH_θ is a threshold value by which it is judged whether or not the accelerator pedal 20 has been depressed enough to generate a motor reaction force Fr. If the depressed amount θ is smaller than the threshold value TH_θ, then it is unnecessary to apply a motor reaction force Fr.

If the depressed amount θ is equal to or greater than the threshold value TH_θ (step S2: YES), then it is understood that the accelerator pedal 20 has been pressed enough to generate a motor reaction force Fr (e.g., the vehicle 10 is undergoing acceleration or is cruising at a target speed). In this case, control proceeds to step S3. If the depressed amount θ is smaller than the threshold value TH_θ (S2: NO), then it is understood that the accelerator pedal 20 has not been pressed enough to generate a motor reaction force Fr (e.g., the vehicle 10 is at rest or the vehicle speed is lower than the target speed). In this case, control proceeds to step S6.

In step S3, the ECU 16 calculates a change Δθ (degrees/second) in the depressed amount θ per unit time.

In step S4, the ECU 16 judges whether or not the change Δθ is equal to or greater than a threshold value TH_Δθ. The threshold value TH_Δθ is a second threshold value by which it is judged whether the clutch 70 should be engaged or disengaged. According to the present embodiment, the threshold value TH_Δθ is a threshold value by which it is judged whether or not the driver or user has returned the accelerator pedal 20. The threshold value TH_Δθ may be set to a value of zero or smaller than zero.

If the change Δθ is equal to or greater than the threshold value TH_Δθ (S4: YES), then it is understood that the accelerator pedal 20 is kept still (the vehicle 10 continues to be driven at a constant speed) or is currently being pressed (the vehicle 10 is accelerating). Then, in step S5, the ECU 16 applies the control signal Sc in order to engage the clutch 70. At this time, the motor force Fm, which is generated by the motor 36, is transmitted through the clutch 70 to the speed reducer 72.

If the change Δθ is smaller than the threshold value TH_Δθ (S4: NO), then it is understood that the accelerator pedal 20 is being returned (the vehicle 10 is decelerating). Then, control proceeds to step S6.

If the depressed amount θ is smaller than the threshold value TH_θ in step S2 (S2: NO), or if the change Δθ is smaller than the threshold value TH_Δθ in step S4 (S4: NO), then in step S6, the ECU 16 applies the control signal Sc in order to disengage the clutch 70. At this time, the motor force Fm, which is generated by the motor 36, is not transmitted to the speed reducer 72. If the accelerator pedal 20 is returned, i.e., if the depressed amount θ is decreasing (S4: NO), then the rotational angle (phase) of the output shaft 58 of the motor 36 (the rotational angle θm of the motor 36) and the rotational angle (phase) of the input shaft 74 of the speed reducer 72 deviate from each other. As a result, the rotational angle θm of the motor 36 and the depressed amount θ of the accelerator pedal 20 also deviate from each other.

The ECU 16 repeats the operation sequence shown in FIG. 8 while the vehicle 10 is being driven.

FIG. 9 is a diagram showing by way of example a relationship between states and depressed amounts θ of the accelerator pedal 20, rotational angles θm of the motor 36, motor reaction forces Fr, and engaged and disengaged states of the clutch 70. In the example shown in FIG. 9, it is assumed that the speed reducer 72 is dispensed with, and that the effect of the gear ratio, to be described later, is not taken into account (a later-described gear ratio n is not used). Therefore, it should be noted that the numerical values of the depressed amount θ and the rotational angles θm in FIG. 9 are given by way of example only for facilitating understanding of the present invention.

At time t1 in FIG. 9, the vehicle 10 is being driven at or nearly at a target speed, and the accelerator pedal 20 is in an appropriate position. Stated otherwise, the depressed amount θ of the accelerator pedal 20 is equal to or greater than the threshold value TH_θ (e.g., TH_θ=5) (S2: YES). At this time, the motor 36 generates a large motor reaction force Fr, and the clutch 70 is engaged.

At time t2, the accelerator pedal 20 is depressed further from the position at time t1. More specifically, at this time, the driver has pressed the accelerator pedal 20 in order to accelerate the vehicle 10. At time t2, the motor reaction force Fr of the motor 36 is reduced, thereby making it easier for the driver to press the accelerator pedal 20. Since the change Δθ in the depressed amount θ per unit time is equal to or greater than the threshold value TH_Δθ (e.g., zero), the clutch 70 remains engaged. At time t2, therefore, the depressed amount θ of the accelerator pedal 20 and the rotational angle θm of the motor 36 are increased from those at time t1.

At time t3, the driver finishes accelerating the vehicle 10, and switches to driving the vehicle 10 at a constant speed, so that a condition occurs in which the accelerator pedal 20 is returned. At time t3, therefore, the depressed amount θ of the accelerator pedal 20 is decreased from that at time t2. When the accelerator pedal 20 is returned, the change Δθ becomes smaller than the threshold value TH_Δθ, and the depressed amount θ is smaller than the threshold value TH_θ. Consequently, the ECU 16 disengages the clutch 70. Thus, at time t3, the rotational angle θm of the motor 36 is of the same value as at time t2.

At time t4, the driver presses the accelerator pedal 20 again to bring the vehicle 10 back to a constant speed. At time t4, in the same manner as at time t1, the accelerator pedal 20 is in an appropriate position. Therefore, the motor 36 generates a motor reaction force Fr, and the clutch 70 is engaged. The depressed amount θ of the accelerator pedal 20 at time t4 is the same as at time t1. However, the rotational angle θm of the motor 36 at time t4 differs from that at time t1, because the depressed amount θ and the rotational angle θm have deviated from each other upon disengagement of the clutch 70 when the accelerator pedal 20 was returned at time t3.

Since the depressed amount θ and the rotational angle θm are made to deviate from each other through operation of the accelerator pedal 20, the rotational angle θm of the motor 36 can be made equal to or greater than 360°.

5. Gear Ratio of Speed Reducer 72:

According to the present embodiment, as described above, since the depressed amount θ and the rotational angle θm are made to deviate from each other, the rotational angle θm of the motor 36 becomes equal to or greater than 360°. Furthermore, according to the present embodiment, the rotational angle θm of the motor 36 is guaranteed to become equal to or greater than 360° by adjusting the gear ratio n of the speed reducer 72.

First, the gear ratio n is defined according to the following equation (1):

$$\theta m = \theta ma \times n \quad (1)$$

where θma represents an angular range through which the motor-connected arm 40 can be turned (FIG. 3).

In order to make the rotational angle θm equal to or greater than 360°, it is necessary that the following inequality (2) be satisfied:

$$\theta ma \times n \geq 360 \quad (2)$$

The above inequality (2) can be rewritten as the following inequality (3):

$$n \geq 360/\theta ma \quad (3)$$

Therefore, once the angular range θma is known, the gear ratio n can be identified. For example, if the angular range θma is 22°, then the rotational angle θm can be made equal to or greater than 360° by setting the gear ratio n to 16.37 (≈360/22) or greater.

With the gear ratio n set in this manner, even if the clutch 70 cannot be disengaged due to a failure, the rotational angle θm of the motor 36 can be guaranteed to become equal to or greater than 360°.

Although it has been described above that the gear ratio n is set based on the angular range θma, which defines an angular range through which the motor-connected arm 40 can be turned, the gear ratio n may also be set based on an angularly movable range, which defines a normal movable range within which the accelerator pedal 20 is movable. The normal movable range is an angularly movable range for the accelerator pedal 20, which is highly likely to be used while the vehicle 10 is being driven. For example, the normal movable range implies an angularly movable range for the accelerator pedal 20, which corresponds to a certain range of speeds with respect to a set target speed for constant-speed driving.

In order to determine the range for the gear ratio n, it is preferable to set the rotational angle θm of the motor 36 to 720° or greater, for example. Further, taking into consideration durability of the speed reducer 72, etc., the rotational angle θm of the motor 36 preferably is set to an angle that is equal to or smaller than 1440°, for example.

6. Advantages of the Present Embodiment:

According to the present embodiment, as described above, the clutch 70 is temporarily disengaged upon displacement of the accelerator pedal 20 (S6 in FIG. 8). Therefore, after the clutch 70 is disengaged, the depressed amount θ of the accelerator pedal 20 and the rotational angle θm of the motor 36 deviate from each other (the relative positional relationship therebetween changes). Consequently, forces that act on parts (such as parts of the motor 36, etc.) of the force applier 26 that transmits the motor force Fm are prevented from being concentrated only on certain parts, thereby making it possible to increase the overall durability of the force applier 26. According to the present embodiment, in particular, inasmuch as the motor 36 is a brush motor, the range within which the commutator 60 and the brushes 62 are in contact with each other is increased, thereby spreading out any worn regions. As a consequence, noise and load differences are prevented from occurring due to different amounts of wear caused by wearing of certain regions only, thereby preventing the user from feeling strange concerning the manner in which the reaction force pedal device operates.

According to the present embodiment, the threshold value TH_Δθ by which it is judged whether the accelerator pedal 20 should be returned or not, is established with respect to the change Δθ in the depressed amount θ per unit time, and the clutch 70 is temporarily disengaged when the change Δθ exceeds the threshold value TH_Δθ (according to the present embodiment, when the change Δθ becomes smaller than the threshold value TH_Δθ) (S4: NO→S6 in FIG. 8). Generally, when the accelerator pedal 20 is returned (especially when the accelerator pedal 20 is returned at a high speed), the need for generating the motor reaction force Fr is smaller than when the accelerator pedal 20 is depressed or is kept in a constant position. With the above arrangement according to the present embodiment, it is possible to make the depressed amount θ of the accelerator pedal 20 and the rotational angle θm of the motor 36 deviate from each other if the need for generating the motor reaction force Fr is small. Therefore, the relationship between the depressed amount θ and the rotational angle θm can be adjusted without causing the driver to feel uncomfortable.

According to the present embodiment, the speed reducer 72 is disposed between the motor 36 and the motor-connected arm 40, and the gear ratio n of the speed reducer 72 is set such that the rotational angle θm of the motor 36 becomes equal to or greater than 360° upon displacement of the motor-connected arm 40 through the angular range θma. Consequently, when the accelerator pedal 20 is angularly displaced maximally, the output shaft 58 of the motor 36 rotates about its axis through 360° or greater. Therefore, forces that act on parts of the motor 36 are prevented from being concentrated only on certain parts, thereby making it possible to increase the overall durability of the force applier 26. Since the motor 36 is a brush motor, the range of mutual contact between the commutator 60 and the brushes 62 is increased, thereby spreading out any worn regions. As a consequence, noise and load differences are prevented from occurring due to different amounts of wear caused by wearing of certain regions only. Even in the event of a failure of the clutch 70, the motor 36 is guaranteed to rotate the output shaft 58 through 360° or greater, thereby allowing the reaction force pedal device to operate in the above-described manner and to offer the advantages described above.

According to the present embodiment, even at times when there is no need to generate the motor reaction force Fr, the backlash compensation force Fb is generated to eliminate backlash in the force transmitting system from the motor 36 to the accelerator pedal 20. Therefore, when there is no need to generate the motor reaction force Fr, backlash is eliminated in the force transmitting system from the motor 36 to the accelerator pedal 20. Consequently, if the motor reaction force Fr is generated at a subsequent time, the motor reaction force Fr can be generated with a quick response.

B. Modifications

The present invention is not limited to the above embodiment, but various alternative arrangements may be adopted based on the disclosure of the present description. For example, the present invention may adopt the following arrangements.

1. Vehicle 10:

In the above embodiment, the vehicle 10 comprises a gasoline-powered vehicle. However, the vehicle 10 may comprise an electric vehicle, including a hybrid vehicle, a fuel battery vehicle, or the like.

2. Accelerator Pedal 20:

In the above embodiment, the accelerator pedal 20 is used as a pedal that applies the motor force Fr. However, the principles of the present invention also are applicable to a brake pedal. More specifically, the clutch 70, the backlash compensation force Fb, and the gear ratio n are capable of being utilized in a system in which the motor force Fm is applied to a brake pedal.

3. Biasing Force Generator 24:

In the above embodiment, the biasing force generator 24 is of a mechanical nature. However, the biasing force generator 24 may include an electric or an electromagnetic mechanism.

4. Force Applier 26:

In the above embodiment, the motor 36 is used to generate a force (biasing force), which is applied to the accelerator pedal 20. However, any of various other drive force generating means, such as a pneumatic actuator or the like, may be used to generate a biasing force.

In the above embodiment, the motor force Fm and the second biasing force Fs2 are transmitted to the accelerator pedal 20 through the pedal-connected arm 22. However, the force applier 26 may transmit the motor force Fm and the second biasing force Fs2 directly to the accelerator pedal 20.

In the above embodiment, the clutch 70, the backlash compensation force Fb, and the gear ratio n are used in combination. However, only one or two of the clutch 70, the backlash compensation force Fb, and the gear ratio n may be used in order to allocate the motor force Fm to the accelerator pedal 20.

In the above embodiment, the clutch 70 is disposed between the motor 36 and the speed reducer 72. However, the clutch 70 may alternatively be disposed between the speed reducer 72 and the motor-connected arm 40.

In the above embodiment, the clutch 70 is disengaged upon return of the accelerator pedal 20. However, the clutch 70 may be disengaged on other occasions or at other times. For example, the clutch 70 may be disengaged when the driver intends to accelerate the vehicle. More specifically, the ECU 16 may set a threshold value TH_Δθ2 for the change Δθ, by which the driver's intention to accelerate the vehicle is determined. If the change Δθ is equal to or greater than the threshold value TH_Δθ2, the ECU 16 may disengage the clutch 70, whereas if the change Δθ is smaller than the threshold value TH_Δθ2, then the ECU 16 may engage the clutch 70. Alternatively, the ECU 16 may judge whether or not a command value for the motor reaction force Fr is zero. If the command value is zero, the ECU 16 may disengage the clutch 70, whereas if the command value is other than zero, the ECU 16 may engage the clutch 70.

In the above embodiment, the backlash compensation force Fb is applied in order to eliminate backlash in the force applier 26. However, backlash in the force applier 26 may be eliminated in other ways.

Figure 10:
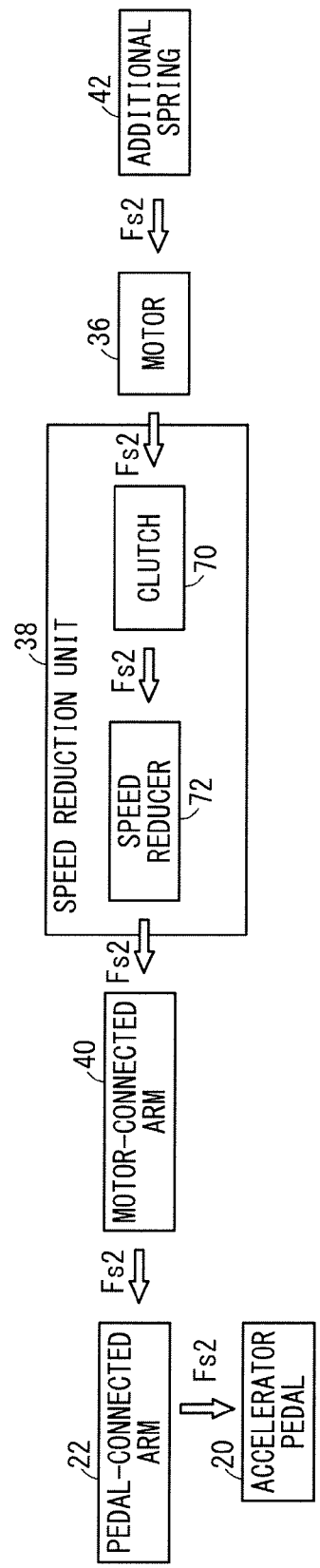
FIG. 10 is a block diagram showing a first modification of the arrangement shown in FIG. 7.

FIG. 10 is a block diagram showing a first modification of the arrangement shown in FIG. 7. FIG. 11 is a block diagram showing a second modification of the arrangement shown in FIG. 7.

According to the first modification, as shown in FIG. 10, the additional spring 42 (biasing member) is disposed in a different position, so as to apply the second biasing force Fs2 to the output shaft 58 of the motor 36. According to the first modification, the output shaft 58 of the motor 36 is capable of projecting not only toward the clutch 70 (i.e., to the left in FIG. 10), but also toward the additional spring 42 (i.e., to the right in FIG. 10). The direction in which the second biasing force Fs2 is added from the additional spring 42 is the same as the direction in which the motor reaction force Fr is generated.

According to the first modification shown in FIG. 10, the second biasing force Fs2 is applied to the output shaft 58 of the motor 36 in a direction in which the motor reaction force Fr is generated. Therefore, even if the motor force Fm is not generated, backlash in the force applier 26 is eliminated. Stated otherwise, the backlash compensation force Fb is generated by the additional spring 42 and not by the motor 36. Consequently, if the motor reaction force Fr is generated at a subsequent time, the motor reaction force Fr can be generated with a quick response.

According to the second modification shown in FIG. 11, in the arrangement shown in FIG. 10, a second speed reducer 90 is disposed between the motor 36 and the additional spring 42. The second speed reducer 90 serves to reduce the rotational angle of the output shaft 58 of the motor 36, which is produced under the second biasing force Fs2 from the additional spring 42. According to the second modification, in addition to the advantages of the first modification, the second biasing force Fs2 from the additional spring, which also serves as the backlash compensation force Fb according to the second modification, can be finely adjusted with ease.

The invention claimed is:

1. A reaction force pedal device comprising:
   a pedal member operable by a driver and having a pedal-connected arm connected thereto;
   a motor having a rotatable output shaft for applying a reaction force to the pedal member through a motor-connected arm, which is coupled at all times to the pedal member by a spring;
   a biasing member for applying a biasing force at all times, in addition to the reaction force generated by the motor, in a direction in which the reaction force is generated by the motor to abut the motor-connected arm against the pedal-connected arm; and
   a clutch disposed between the motor output shaft and the motor-connected arm,
   wherein
   one end of the motor-connected arm is held in abutment with the pedal-connected arm and an opposite end of the motor-connected arm is coupled to the spring, and
   the clutch is a controlled clutch which is disengaged only during return of the pedal member toward a non-actuated position thereof, to thereby deviate a rotational angle of the motor output shaft from an amount at which the pedal member is depressed in a subsequent operation of the pedal member.

2. The reaction force pedal device according to claim 1, further comprising:
a speed reducer disposed between the motor output shaft and the motor-connected arm,
wherein the speed reducer has a speed reduction ratio which is preset based on a displaceable range of the motor-connected arm such that the motor output shaft will rotate through an angle equal to or greater than 360° when the motor-connected arm is fully displaced through the displaceable range thereof.

3. The reaction force pedal device according to claim 1, wherein the motor applies a reaction force to the pedal member through the motor-connected arm whenever the pedal member is depressed at least a preset amount.

4. The reaction force pedal device according to claim 1, further comprising:
a speed reducer disposed between the motor output shaft and the motor-connected arm, wherein the motor output shaft and an input shaft of the speed reducer are physically and temporarily disengaged by the controlled clutch during return of the pedal member toward the non-actuated position thereof.

5. The reaction force pedal device according to claim 1, further comprising an electronic control unit which controls operations of the controlled clutch.

6. A reaction force pedal device comprising:
a pedal member operable by a driver and having a pedal-connected arm connected thereto;
a motor having a rotatable output shaft for applying a reaction force to the pedal member through a motor-connected arm, which is coupled at all times to the pedal member by a spring;
a biasing force generator that applies a biasing force to the pedal member through the pedal-connected arm, wherein the biasing force generator is in contact with the pedal connected arm at all times; and
a clutch disposed between the motor output shaft and the motor-connected arm,
wherein
one end of the motor-connected arm is held in abutment with the pedal-connected arm and an opposite end of the motor-connected arm is coupled to the spring, and the clutch is a controlled clutch which is disengaged only during return of the pedal member toward a non-actuated position thereof, to thereby deviate a rotational angle of the motor output shaft from an amount at which the pedal member is depressed in a subsequent operation of the pedal member.

\* \* \* \* \*